US 7,096,358 B2

(12) United States Patent
Zizzi

(10) Patent No.: US 7,096,358 B2
(45) Date of Patent: Aug. 22, 2006

(54) ENCRYPTING FILE SYSTEM

(75) Inventor: Stephen Zizzi, Albany, NY (US)

(73) Assignee: MAZ Technologies, Inc., Las Vegas, NV (US)

( * ) Notice: Subject to any disclaimer, the term of this patent is extended or adjusted under 35 U.S.C. 154(b) by 436 days.

(21) Appl. No.: 10/658,246

(22) Filed: Sep. 8, 2003

(65) Prior Publication Data
US 2004/0059912 A1    Mar. 25, 2004

Related U.S. Application Data

(63) Continuation-in-part of application No. 09/259,991, filed on Mar. 1, 1999, now Pat. No. 6,981,141, which is a continuation-in-part of application No. 09/074,191, filed on May 7, 1998, now Pat. No. 6,185,681.

(51) Int. Cl.
*H04L 9/32*    (2006.01)
(52) U.S. Cl. .................. 713/165; 713/164; 726/27
(58) Field of Classification Search .............. 713/159, 713/164, 165, 172, 185; 726/27, 28; 380/286
See application file for complete search history.

(56) References Cited

U.S. PATENT DOCUMENTS

| | | | |
|---|---|---|---|
| 4,238,854 A | 12/1980 | Ehrsam et al. ............... 375/2 |
| 4,278,837 A | 7/1981 | Best ....................... 178/22.09 |
| 4,386,234 A | 5/1983 | Ehrsam et al. ........... 178/22.09 |
| 4,432,064 A | 2/1984 | Barker et al. ............... 361/550 |
| 4,438,494 A | 3/1984 | Budde et al. ............... 364/200 |
| 4,442,484 A | 4/1984 | Childs, Jr. et al. .......... 364/200 |
| 4,453,074 A | 6/1984 | Weinstein ................... 235/380 |
| 4,551,810 A | 11/1985 | Levine ....................... 364/475 |
| 4,558,413 A | 12/1985 | Schmidt et al. ............. 364/300 |
| 4,568,936 A | 2/1986 | Goldman ............... 340/825.34 |
| 4,573,119 A | 2/1986 | Westheimer et al. ........ 364/200 |
| 4,584,639 A | 4/1986 | Hardy ........................ 364/200 |
| 4,588,991 A | 5/1986 | Atalia ................... 340/825.31 |
| 4,591,975 A | 5/1986 | Wade et al. ................ 364/200 |
| 4,633,036 A | 12/1986 | Hellmann et al. ........ 178/22.11 |
| 4,757,533 A | 7/1988 | Allen et al. .................... 380/25 |
| 4,780,821 A | 10/1988 | Crossley ..................... 364/200 |
| 4,780,905 A | 10/1988 | Cruts et al. .................... 380/44 |
| 4,807,287 A | 2/1989 | Tucker et al. ................. 380/23 |
| 4,893,338 A | 1/1990 | Pastor ........................ 380/25 |
| 4,893,340 A | 1/1990 | Lubarsky et al. ............. 380/80 |
| 4,907,228 A | 3/1990 | Bruckert et al. ........... 371/68.3 |
| 4,916,704 A | 4/1990 | Bruckert et al. ........... 371/68.3 |
| 4,924,378 A | 5/1990 | Hershey et al. ............. 364/200 |
| 4,937,861 A | 6/1990 | Cummins ....................... 380/2 |
| 4,956,769 A | 9/1990 | Smith ......................... 364/200 |
| 4,981,370 A | 1/1991 | Dziewit et al. ............... 380/25 |

(Continued)

OTHER PUBLICATIONS

Vault Corp., The Snoop-Proof Disk, Filelok, p. 2 of 2.

(Continued)

*Primary Examiner*—Justin T. Darrow
(74) *Attorney, Agent, or Firm*—SoCal IP Law Group LLP; Steven C. Sereboff; Joel G. Landau

(57) ABSTRACT

An encryption method that is largely transparent to a user is accomplished by intercepting a change document or open document command, carrying out an encryption or decryption process, and then completing the command on an encrypted or decrypted file. The encryption method can be used in a wide variety of environments, such as an individual computer program, a database or electronic messaging over the Internet. The encryption method can select from a plurality of encryption algorithms.

15 Claims, 5 Drawing Sheets

U.S. PATENT DOCUMENTS

| | | |
|---|---|---|
| 5,005,174 A | 4/1991 | Bruckert et al. ............ 371/68.3 |
| 5,007,082 A | 4/1991 | Cummins ..................... 380/4 |
| 5,052,040 A | 9/1991 | Preston et al. ................. 380/4 |
| 5,063,596 A | 11/1991 | Dyke ........................... 380/49 |
| 5,065,312 A | 11/1991 | Bruckert et al. ............ 395/575 |
| 5,068,780 A | 11/1991 | Bruckert et al. ............ 395/700 |
| 5,099,485 A | 3/1992 | Bruckert et al. ........... 371/68.3 |
| 5,113,442 A | 5/1992 | Moir ........................... 380/25 |
| 5,142,578 A | 8/1992 | Matyas et al. ................ 380/21 |
| 5,153,881 A | 10/1992 | Bruckert et al. ........... 371/11.3 |
| 5,163,138 A | 11/1992 | Thirumalai ................. 395/325 |
| 5,175,852 A | 12/1992 | Johnson et al. ............. 395/600 |
| 5,224,166 A | 6/1993 | Hartmann, Jr. .............. 380/50 |
| 5,249,187 A | 9/1993 | Bruckert et al. ........... 371/68.1 |
| 5,251,227 A | 10/1993 | Bruckert ..................... 371/12 |
| 5,255,367 A | 10/1993 | Bruckert ..................... 395/200 |
| 5,263,147 A | 11/1993 | Francisco et al. ........... 385/425 |
| 5,263,157 A | 11/1993 | Janis ........................... 395/600 |
| 5,276,859 A | 1/1994 | Reede .......................... 385/55 |
| 5,289,540 A | 2/1994 | Jones ........................... 380/4 |
| 5,291,494 A | 3/1994 | Bruckert et al. ........... 371/11.3 |
| 5,313,579 A | 5/1994 | Chao ........................... 395/200 |
| 5,319,705 A | 6/1994 | Halter .......................... 380/4 |
| 5,325,430 A | 6/1994 | Smyth .......................... 380/4 |
| 5,333,198 A | 7/1994 | Houlberg et al. ............. 380/49 |
| 5,339,408 A | 8/1994 | Bruckert et al. ............ 395/575 |
| 5,343,525 A | 8/1994 | Hung et al. ..................... 380/4 |
| 5,347,559 A | 9/1994 | Hawkins ...................... 377/54 |
| 5,388,196 A | 2/1995 | Pajak et al. ................. 385/153 |
| 5,394,469 A | 2/1995 | Nagel et al. ..................... 380/4 |
| 5,404,861 A | 4/1995 | Wild ........................... 123/674 |
| 5,406,624 A | 4/1995 | Tulpan .......................... 380/4 |
| 5,410,598 A | 4/1995 | Shear ............................. 380/4 |
| 5,410,693 A | 4/1995 | Yu et al. ...................... 395/600 |
| 5,416,842 A | 5/1995 | Aziz ............................. 380/30 |
| 5,455,863 A | 10/1995 | Brown et al. ................. 380/23 |
| 5,463,772 A | 10/1995 | Thompson et al. ......... 375/600 |
| 5,483,649 A | 1/1996 | Kuzhetsov et al. ......... 395/186 |
| 5,490,100 A | 2/1996 | Kableshkov ................ 364/736 |
| 5,490,252 A | 2/1996 | Macera et al. ......... 395/200.01 |
| 5,495,533 A | 2/1996 | Linehan et al. ............... 380/21 |
| 5,506,961 A | 4/1996 | Carlson ..................... 395/186 |
| 5,511,122 A | 4/1996 | Atkinson ..................... 380/25 |
| 5,546,583 A | 8/1996 | Shriver ....................... 395/650 |
| 5,584,023 A | 12/1996 | Hsu ........................... 395/620 |
| 5,596,718 A | 1/1997 | Boebert ................... 375/187.01 |
| 5,596,745 A | 1/1997 | Lai et al. .................... 395/614 |
| 5,598,470 A | 1/1997 | Cooper et al. ................. 380/4 |
| 5,600,831 A | 2/1997 | Levy et al. ................. 395/602 |
| 5,657,470 A | 8/1997 | Fisherman et al. ......... 395/480 |
| 5,694,472 A * | 12/1997 | Johnson et al. ............. 713/189 |
| 5,699,428 A | 12/1997 | McDonnal et al. ............ 380/4 |
| 5,713,018 A | 1/1998 | Chan .......................... 395/610 |
| 5,721,777 A | 2/1998 | Blaze ............................ 380/4 |
| 5,778,072 A | 7/1998 | Samar ......................... 380/30 |
| 5,787,169 A | 7/1998 | Eldridge et al. ................ 380/4 |
| 5,796,825 A | 8/1998 | McDonnel et al. ............ 380/4 |
| 5,815,571 A | 9/1998 | Finley ............................ 380/4 |
| 5,870,468 A | 2/1999 | Harrison ....................... 380/4 |
| 5,870,477 A | 2/1999 | Sasaki et al. .................. 380/25 |
| 5,940,507 A | 8/1999 | Cane et al. ..................... 380/4 |
| 5,987,123 A | 11/1999 | Scott et al. ..................... 380/4 |
| 6,023,506 A | 2/2000 | Ote et al. ....................... 380/4 |
| 6,105,133 A | 8/2000 | Fielder et al. .............. 713/169 |
| 6,134,659 A | 10/2000 | Sprong et al. .............. 713/190 |
| 6,154,840 A | 11/2000 | Pebley et al. ............... 713/160 |
| 6,192,472 B1 | 2/2001 | Garay et al. ................. 713/165 |
| 6,249,866 B1 | 6/2001 | Brundrett et al. ........... 713/165 |
| 6,378,071 B1 | 4/2002 | Sasaki et al. ............... 713/165 |
| 6,564,321 B1 | 5/2003 | Bobo .......................... 713/68 |

OTHER PUBLICATIONS

FWB Inc. of San Francisco, CA., Hard Disk Partition (™) v3.
Symantec Corp., Norton Utilities for DOS/Windows 3.x.
Secure File System Information, Secure File System (SFS) for DOS/Windows.
Invincible Data Systems, Inc., Invincible Disk, p. 1 of 1.
Kiran Movva, Security Designed for Your Eyes Only, p. 1 of 5.
Ermelindo Mauriello, Transparent Cryptogaphic File System.
A. Del Sorbo, Design and Implementation of a Transparent Cryptographic File System for Unix, p. 1 of 6, Universita di Salerno, Baronissi (SA), Italy.
VDDR.TXT, Virtual Encrypted Disk Facility, p. 1 of 12.

* cited by examiner

ENCRYPTING FILE SYSTEM

RELATED APPLICATION INFORMATION

This application is a continuation-in-part of application Ser. No. 09/259,991 filed Mar. 1, 1999, now U.S. Pat. No. 6,981,141; which is a continuation-in-part of application Ser. No. 09/074,191 filed May 7, 1998, now U.S. Pat. No. 6,185,681, the disclosures of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates generally to cryptographic systems and electronic document management systems.

2. Description of Related Art

Global access of electronic information can be critical for even the smallest of businesses today. Very few companies operate solely within the boundaries of a single location or their employee list. Over the last 25 years technology has rapidly advanced and expanded these boundaries. The advent of such technologies as the Internet, intranets, extranets, and e mail have made the electronic transfer of information common place in businesses today. Management of business information is critical to the success of modern businesses. A technology known as Electronic Document Management (EDM) aims to provide organizations with the ability to find any document, created in any application, by anyone, at any time, dealing with any subject, at any place in the world. EDM includes managing multiple versions of a document. PC DOCS, Inc. (Burlington, Mass.) is one of the world's leading providers of EDM solutions. With the advanced technology of EDM comes a wide variety of information that has varying economic values and privacy aspects. Users may not know what information is monitored or intercepted or who is using their computer.

An electronic document management system (EDMS) is a combination of databases, indexes, and search engines utilized to store and retrieve electronic documents distributed across an organization. An EDMS is designed to provide the structure required for an organization to properly manage and share its electronic document resources A wide array of information is typically stored in a company's EDMS. This includes:
 strategic and corporate plans;
 proprietary product and service information;
 confidential legal documents;
 private health information; and
 private employment information.

As companies increase the efficiency of accessing more information, their security risks also increase. According to a recent survey by Ernst & Young LLP:

74% of the respondents said their security risks have increased over the prior two years;
 more than a quarter said that their security risks have increase at a faster rate than the growth of their computing;
 55% of the respondents lacked confidence that their computer systems could withstand an internal attack
 71% of security professionals are not confident that their organizations are protected from external attack; and
 two thirds of the respondents reported losses resulting from a security breach over the prior two years.

The bottom line is simple—the more information available, the more security needed.

It has been said that "There is no need to break the window of a house if the front door is unlocked." This saying certainly applies to computer security. The "unlocked doors" in electronic information security include:
 e mail;
 electronic document management (including non-EDMS file systems); and
 stolen hardware.

One of the fastest growing means of communication today is e mail. It is estimated that over one million e-mail messages pass through the Internet every hour. E mail provides a quick, economical, easy to use method of sharing both thoughts and electronic information. Unfortunately, e mail is like an electronic postcard for the world to see. It is transmitted across the Internet using the Simple Mail Transfer Protocol (SMTP). This protocol has virtually no security features. Messages and files can be read by anyone who comes into contact with them.

The number of documents managed by organizations increases daily. Knowledge is becoming the most important product for companies today. As EDM enhances a company's productivity and efficiency to manage that knowledge it also exposes that company to unauthorized access to that knowledge. The typical EDMS solely relies on password protection for security.

The value of the approximately 265,000 portable computers (laptops, notebooks, palmtops) reported stolen in 1996 was $805 million, a 27% increase from 1995. However, the data on these portable computers is worth much more than the hardware itself. It is critical that the data stored on any type of hardware, whether it is a desktop computer, portable computer or server, must be properly secured form any unauthorized access.

Some of the "locks" used for electronic information security include:
 passwords,
 firewalls,
 smart cards, and
 encryption.

Passwords are often used to prevent unauthorized individuals from accessing electronic data. Passwords may also be used to link activities that have occurred to a particular individual. The problem with passwords is that if any unauthorized party steals or guesses a password, the security of the computer system may be severely compromised. Passwords are wholly inadequate for file archiving.

Systems using firewalls prevent intruders from accessing the firm's internal systems. Password-based firewall systems do not provide positive user identification nor do they protect electronic data that is stored on a server, has left the firm on a portable computer, is sent via e mail over the Internet, or is stored on a floppy disk.

The typical smart card is a self contained, tamper resistant, credit card size device that serves as a storage device and is equipped with an integrated microprocessor chip an non-volatile electronic memory. The smart card processes information on the integrated microprocessor chip. Security is enhanced because the user must have the smart card along with the user's confidential information (e.g., a password) to gain access to their computer files. Passwords are kept off computer hosts and on the smart card to enhance security. Smart cards typically can only be accessed with a user defined password. Many smart cards include a lock-out feature so that failed attempts at the smart card password will lock the card out to prevent any unauthorized or fraudulent use of the smart card. ISO 7816 compliant smart cards and smart card readers follow industry standards.

Increasingly, information technology professionals are turning to encryption technologies to ensure the privacy of business information. Encryption can provide confidentiality, source authentication, and data integrity. Unfortunately encryption generally is cumbersome and difficult to use. A major obstacle for the implementation of encryption technologies has been their disruption to the users' workflow.

Encryption is a process of scrambling data utilizing a mathematical function called an encryption algorithm, and a key that affects the results of this mathematical function. Data, before becoming encrypted, is said to be "clear text." Encrypted data is said to be "cipher text." With most encryption algorithms, it is nearly impossible to convert cipher text back to clear text without knowledge of the encryption key used. The strength of the encrypted data is generally dependent upon the encryption algorithm and the size of the encryption key.

There are two types of encryption: symmetric (private key) and asymmetric (public key).

Private key encryption uses a common secret key for both encryption and decryption. Private key encryption is best suited to be used in trusted work groups. It is fast and efficient, and properly secures large files. The leading private key encryption is DES (Data Encryption Standard). DES was adopted as a federal standard in 1977. It has been extensively used and is considered to be strong encryption. Other types of private key encryption include: Triple-DES, IDEA, RC4, MD5, Blowfish and Triple Blowfish.

Public key encryption uses a pair of keys, one public and one private. Each user has a personal key pair, and the user's public (or decryption) key is used by others to send encrypted messages to the user, while the private (or decryption) key is employed by the user to decrypt messages received. Public key encryption and key generation algorithms include the public domain Diffie Hellman algorithm, the RSA algorithm invented by Riverst, Shamir and Adleman at the Massachusetts Institute of Technology (MIT), and the Pretty Good Privacy algorithm (PGP) developed by Phil Zimmermann. Because of their mathematical structure, public key encryption is slower than most private key systems, thus making them less efficient for use in a trusted network or for encrypting large files.

Although these private key and public key encryption algorithms do a good job at maintaining the confidentiality of the encrypted matter, they have numerous problems. The biggest obstacle to adoption of any type of encryption system has been ease of use. Typical encryption systems are very cumbersome. They require a user to interrupt their normal work flow, save their clear text document, activate the separate encryption software, and save the cipher text document under a different name. Where the subject document is ordinary e-mail contents, the process is especially cumbersome, because the clear text must first be created in a separate application, then encrypted, then attached to the e-mail message.

A major concern in computing today is "total cost of ownership," or TCO. TCO recognizes that while a program might be inexpensive (or even free in the case of PGP for non-commercial use), there are significant costs in using the software. This includes the cost of installation, training, lost productivity during use and from bugs, and maintenance.

Even where one of the typical encryption systems might satisfy a user's TCO needs, they may not even be an available option. For example, typical EDMSes are self-contained and are not compatible with typical encryption systems.

It is therefore the object of the invention to provide a document encryption and decryption system which solves these problems. It is a further object to provide a document encryption and decryption system which works with minimal disruption of a user's normal workflow. It is a further object to provide a document encryption and decryption system which is compatible with EDMSes. It is a further object to provide a document encryption and decryption system which minimizes TCO. It is a further object to provide a document encryption and decryption system which takes advantage of the features of smart cards which are not available from pure on-line security systems.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
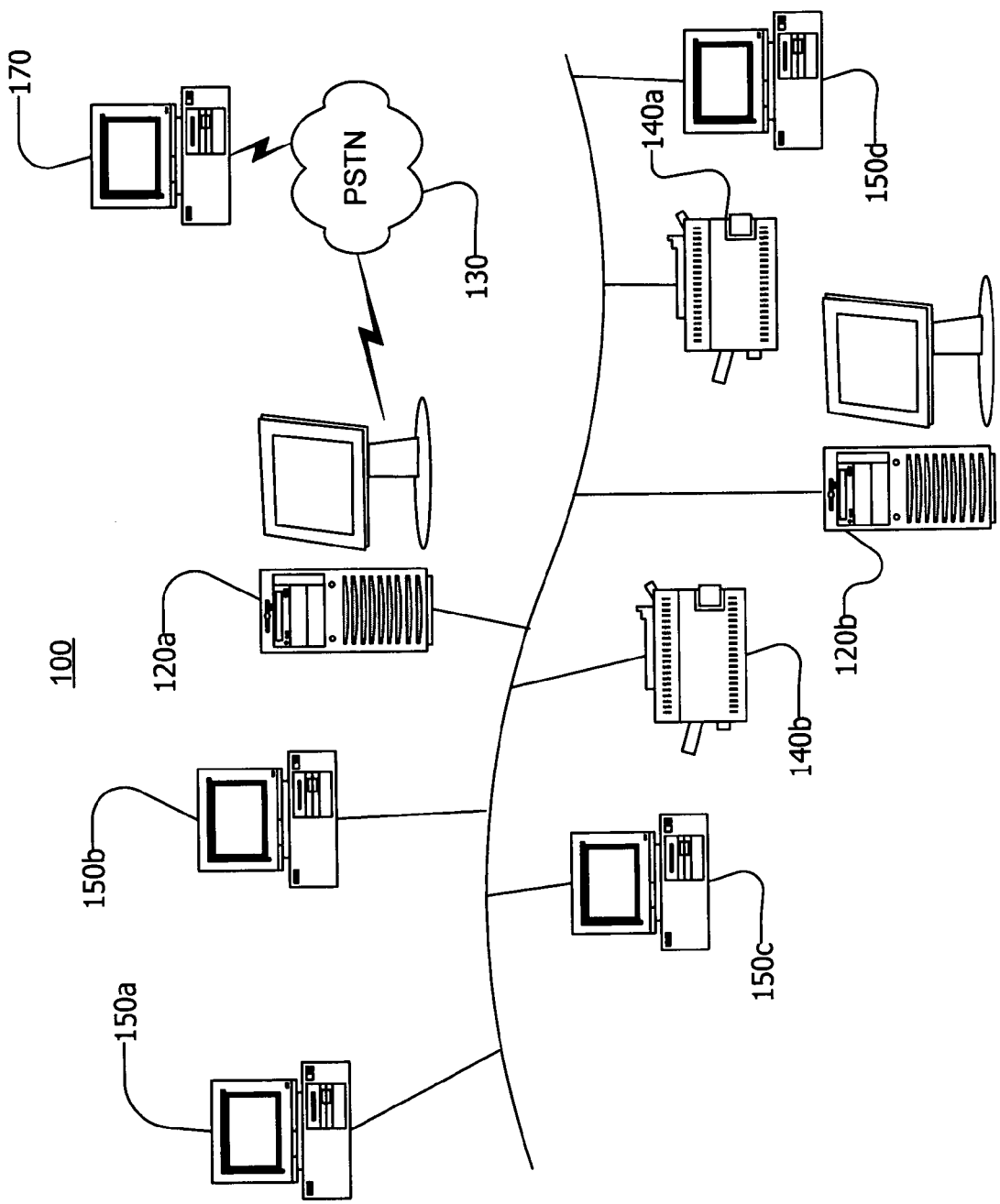
FIG. 1 is a block diagram of a computer network in accordance with the invention.

FIG. 1 shows a local area network (LAN) 100. To network communication lines 160 are coupled a number of workstations 150a, 150b, 150c, 150d. A number of file servers 120a, 120b also are coupled to the network communication lines 160. The network communications lines 160 may be wire, fiber, or wireless channels as known in the art. A user at any of the workstations 150 preferably may log on to at least one file server 120 as known in the art, and in some embodiments a workstation 150 may be logged on to multiple file servers 120. One or more remote workstations 170 may be provided for dial-in access to the server 120a through the public switched telephone network 130 or other remote access means. Network printers 140a, 140b are also provided for printing documents. The network 100 may also include hubs, routers and other devices (not shown).

Figure 2:
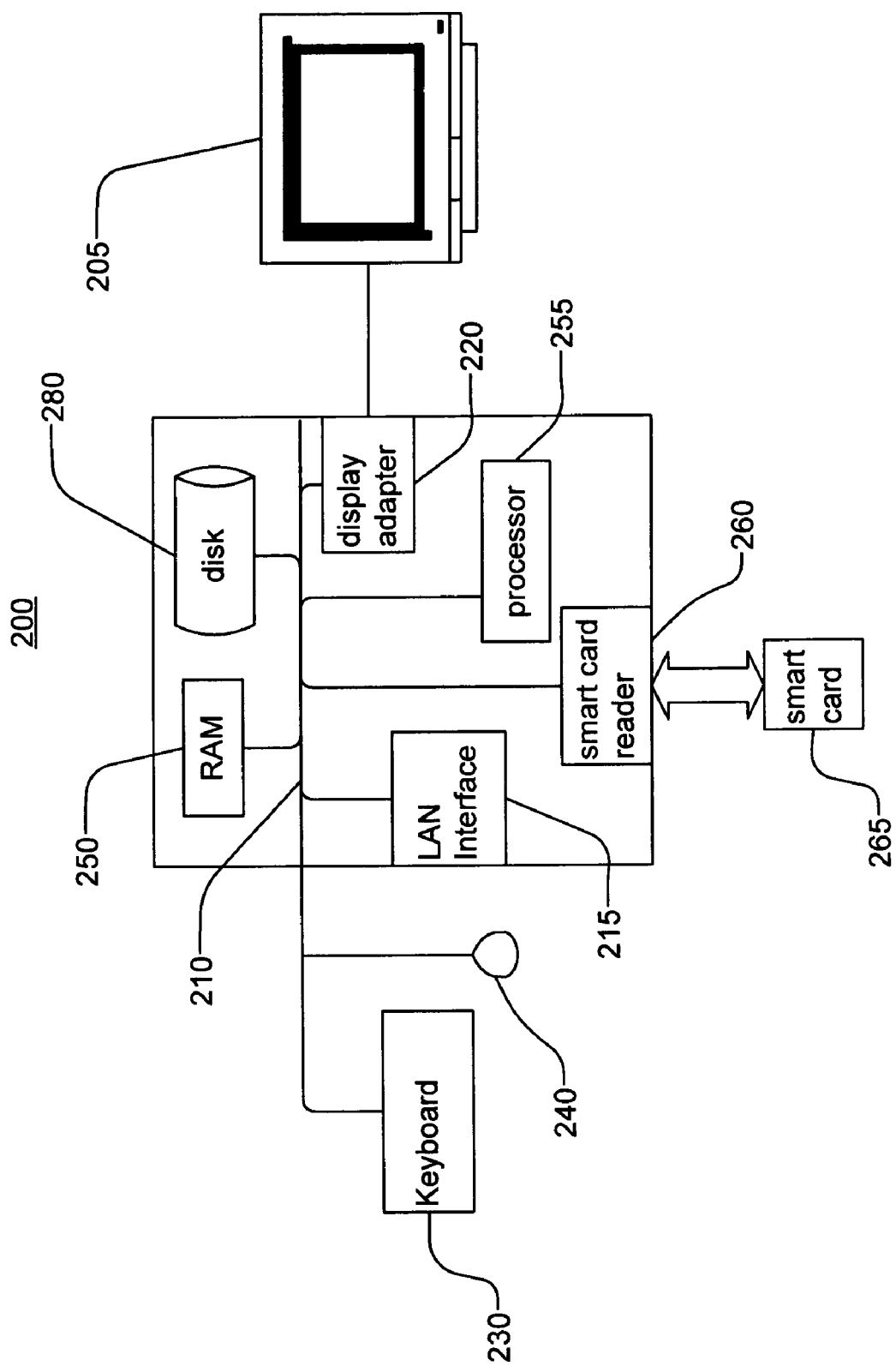
FIG. 2 is a block diagram of a general purpose computer in accordance with the invention.

FIG. 2 shows a general purpose computer 200 which is representative of the workstations 150 and file servers 120. The computer 200 preferably includes an Intel Corporation (San Jose, Calif.) processor 255 and runs a Microsoft Corporation (Redmond, Washington) Windows operating system. In conjunction with the processor 255, the computer 200 has a short term memory 250 (preferably RAM) and a long term memory 280 (preferably a hard disk) as known in the art. The computer 200 further includes a LAN interface 215, a display 205, a display adapter 220, a keyboard 230, a mouse 240, a smart card reader 260 and a bus 210 as known in the art.

The smart card reader 260 preferably complies with ISO 7816, a standard available from the American National Standards Institute (ANSI). To interface the smart card reader 260 to the computer's Windows operating system and other software, the computer 200 preferably includes an API provided by the smart card reader manufacturer. Alternatively, the computer 200 may include Microsoft's smart card API—SCard COM, available at www.microsoft.com/smartcard.

A user's smart card 265 preferably stores a unique user ID and password and a definable hierarchy of encryption keys. The hierarchy preferably forms a table wherein a key name is associated with each key value in the table, and the table may store both encryption keys and decryption keys as necessary for the selected cryptographic algorithms. It should be appreciated that, in private key cryptography, the same key value is used for both encryption and decryption.

Although something as simple as a user ID/password scheme could be used with the keys stored in the disk 280 or memorized by the user, a data reader device and portable data storage device such as the smart card reader 260 and smart card 265 are preferred. Instead of the smart card reader 260 and smart card 265, there could be provided, for example, a biometric recognition system, wireless identification devices, hand held tokens, etc. Preferably, the portable data storage device can securely store one or more encryption and decryption keys. However, a biometric recognition system may provide key selection based on inherent biometric features, eliminating the need to actually store keys in a component external to the computer 200. Where the portable data storage device is used solely as a source of positive identification (i.e., authentication), the keys may be stored on the 120 file server for example and accessed through a certificate mechanism.

Before proceeding, a few terms are defined. By "file server" it is meant a computer which controls access to file and disk resources on a network, and provides security and synchronization on the network through a network operating system. By "server" it is meant hardware or software which provides network services. By "workstation" it is meant a client computer which routes commands either to its local operating system or to a network interface adapter for processing and transmission on the network. By "client" it is meant software which is serviced by a server. A workstation may function as a server by including appropriate software, and may be for example, a print server, archive server or communication server. By "software" it is meant one or more computer interpretable programs and/or modules related and preferably integrated for performing a desired function. By "document" it is meant a named, structural unit of text, graphics and/or other data that can be stored, retrieved and exchanged among systems and users as a separate unit.

Figure 3:
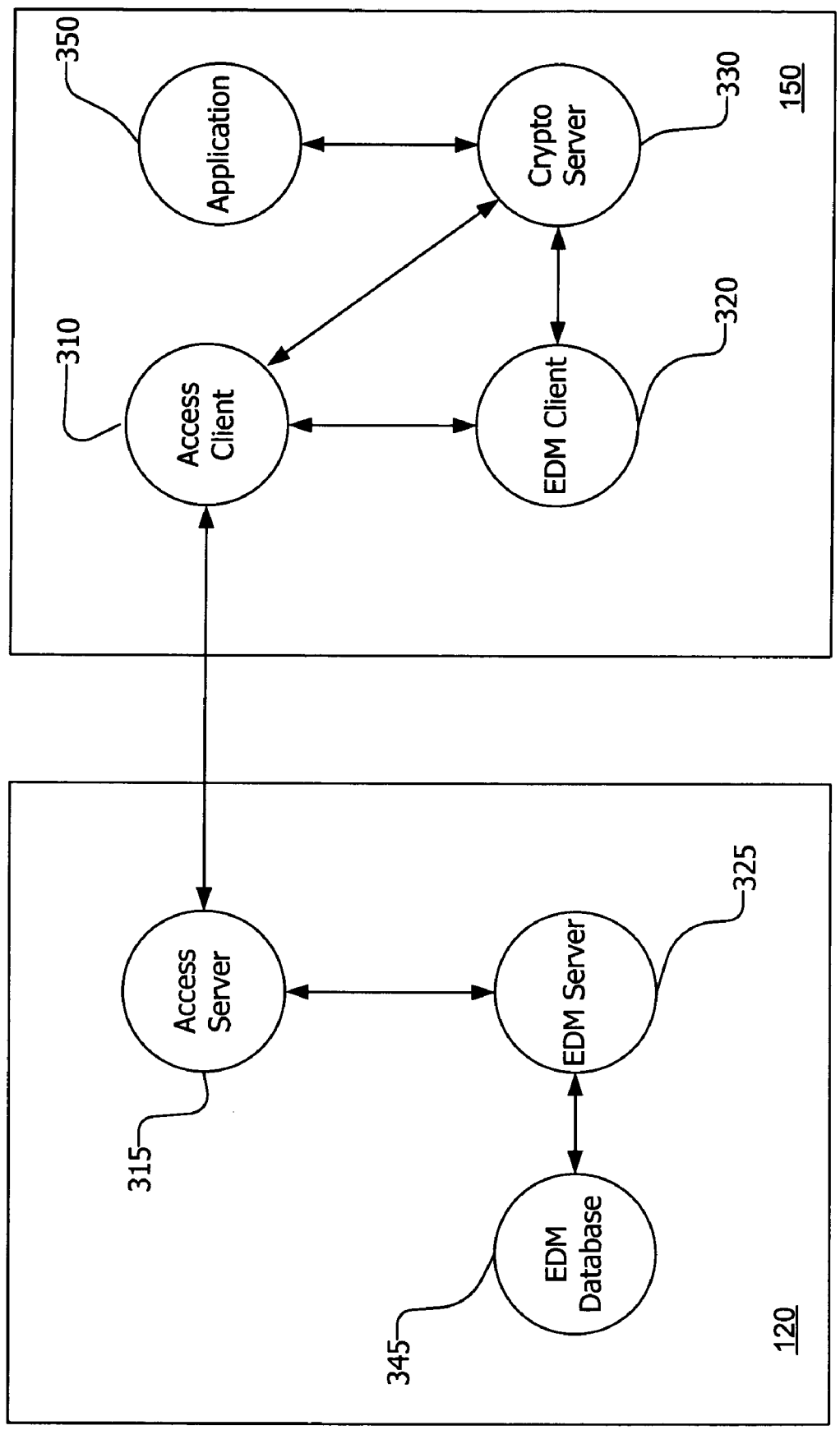
FIG. 3 is a functional block diagram of a cryptographic system in accordance with the invention.

Referring now to FIG. 3, there is shown a conceptual block diagram of several functional units relevant to the invention which operate within the file server 120 and workstation 120. The workstation 150 includes at least one application 350. The application 350 is a collection of software components used to perform specific types of user-oriented work and may be, for example, a graphic editor, a word processor or a spreadsheet.

As is typical in the art, the workstation 150 obtains access to the file server 120 through a user ID and password system which extends to the file system on the file server 120. The file server has an access server 315 for handling the filer server's user authentication and access control duties, and the workstation 150 include an access client 310 through which a user signs on to the file server 120. In the preferred embodiment, the access server 315 is a part of Windows NT Server, and the access client 310 is a part of Windows 95 and Windows NT Workstation. Other operating systems such as Unix and Novell Netware also include access servers and access clients for providing user authentication and file level security.

Within the file server 120 there is preferably an EDM server 310. To interface with the EDM server 325, the workstation 150 includes an EDM client 320, sometimes referred to as an "EDM plug-in." The EDM server 325 controls an EDM database 345 and EDM indexes (not shown), and preferably provides EDM search engines. The EDM database 345 itself may be distributed, for example across file systems and file servers, and may be entirely or partially in the workstation 150. The EDM server 325 may include a database server such as a SQL server for interfacing to the EDM database 345. The EDM client 320 provides the workstation with an interface to the EDM server and therefore allows access by a user at the workstation 150 to the EDM database 345, indexing and search services provided by the EDM server 325.

The EDMS of the preferred embodiment is SQL-based. Thus, the EDM database 345 comprises a SQL database, the EDM server 325 comprises a SQL server, and the EDM client 320 comprises a SQL plug-in. The SQL database stores file and file location information. A "repository," which could be considered part of the EDM database 345, stores the files, and is managed and distributed using techniques known in the art. In older EDM systems, the SQL plug-in comprises special software which adapted particular popular applications for use with the EDMS. However, with the promulgation of the Open Document Management Architecture (ODMA) specification, applications are available which operate seamlessly with many contemporary EDM systems. Under ODAM, the EDM plug-in registers itself so that it handles file I/O.

The EDM server 325, EDM database 345 and EDM client 320 are described herein as wholly separate from the respective operating systems of the file server 120 and workstation 150. However, much if not all of the EDM server 325, EDM database 345 and EDM client 320 could be fully integrated into and even become a part of the respective operating systems. In such an embodiment, the EDMS is just another part of an operating system's general file and data management features.

As can be seen, the access server 315 and the access client 310 functionally reside between the EDM server 325 and the EDM client 320, thereby separating the EDM server 325 and EDM client 320 with a measure of security. This aspect of FIG. 3 is the typical prior art configuration, and it provides file-level security for documents in the EDM database 345 controlled by the EDM server 325.

Positioned functionally between the application 350 and the EDM client 310 is a crypto server 330. In typical prior art systems, the application 350 would communicate directly with the EDM client 310. However, in accordance with the invention, the crypto server 330 is functionally disposed between the application 350 and the EDM client 310, and intercepts or traps I/O requests by the application which otherwise would be intercepted or trapped by the EDM client 310.

The crypto server 330 of the invention is a software module which transparently handles the encryption of documents and the decryption of encrypted documents, making encryption and decryption simple and easy to use. The crypto server 330 handles encryption and decryption without requiring user input and without normally displaying status information during normal encryption and decryption operations. Preferably, the user or a system administrator may establish a system-level configuration determinative of when error messages should be displayed. Preferably, also, the system administrator may create and maintain a file administration table in the EDM database 345 which defines criteria for which files are to be encrypted and which key to use. The crypto server 330 utilizes the file administration table, for example, to determine if a new file should be encrypted, and which encryption key to use to encrypt the new file. The crypto server 330 preferably utilizes and updates an encrypted files table in the EDM database 345 which lists each encrypted file.

The crypto server 330 may itself comprise a number of functional units. For example, the crypto server 330 preferably includes interfaces to one or more cryptographic systems, such as those described in the Description of the Related Art section above. The crypto server 330 preferably also includes an interface to the smart card reader 260 (FIG. 2) for reading the smart card 265. The smart card 265 preferably is used to keep the encryption and decryption keys separate from the workstation 150 and provide positive user identification. The crypto server 330 also works with the access client 310 in performing user authentication and access. In particular, the typical prior art user access process is enhanced by requiring that the user enter a user ID and password which are stored on the user's smart card 265.

Figure 4:
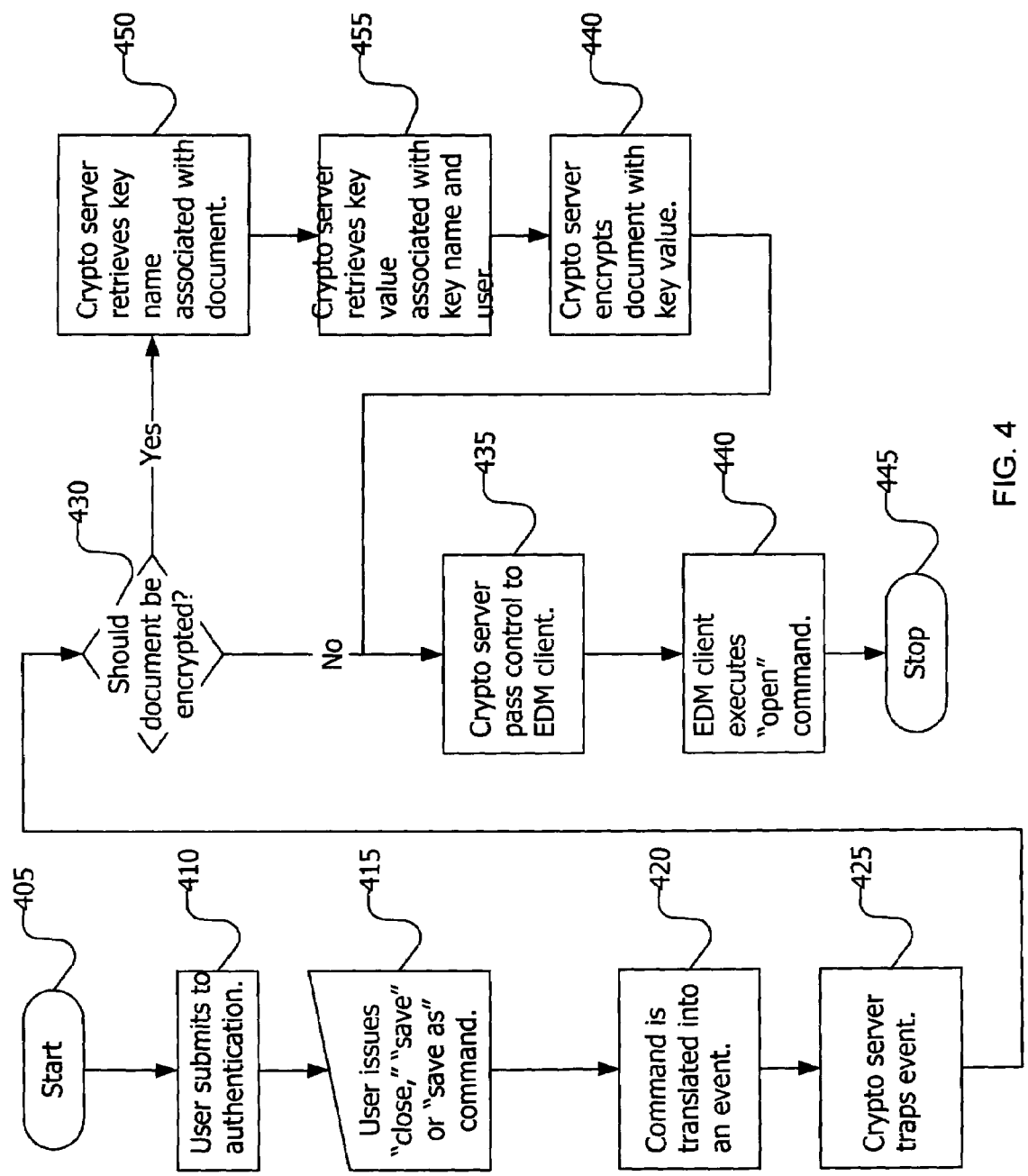
FIG. 4 is a flowchart of an encryption process in accordance with the invention.

Turning now to FIG. 4, there is shown a flowchart of the encryption process in accordance with the invention. After the process begins (step 405), it is preferred that the user submit to authentication by the access client 310 and access server 315 (step 410). The authentication step is preferably performed when the user signs onto the workstation 150. Preferably, the user must insert his smart card 265 into the smart card reader 260 and enter the user ID and password stored on the smart card 265. Once authenticated, the smart card 265 then makes available, as needed, the encryption and decryption key information stored therein.

At some point after the user has been authenticated, the user will be working on a document in the application 350, and at some point issue a "close," "save" or "save as" command as known in the art (step 415). The command is then translated into an "event" (step 420), and the crypto server 330 traps this event (step 425). Techniques for translating commands into events and trapping events are well known in the art and are typically different for each operating system. In Windows, the event translation step comprises generating an event message.

The trapped event has the effect of alerting the crypto server 330 that it may be necessary to encrypt the document. However, preferably before encrypting the document, the crypto server 330 tests whether the document should be encrypted (step 430). Preferably, at least three different tests are performed.

In the first test, the crypto server 330 tests whether the user has been authenticated. The first test is relatively simple. Where the smart card 265 or similar means is used for storing keys, this test is necessary because the keys will not even be available unless the user was authenticated.

In the second test, the crypto server 330 tests whether the document was already encrypted when it was opened by the application 350. By default, a document which was already encrypted when opened should be encrypted when closed or saved.

In the third test, the crypto server 330 tests whether the EDM database 345 has an indicator that the document should be encrypted. As described above, the EDM database 345 includes a list of encrypted documents in an encrypted files table. The EDM database 345 preferably also includes criteria for new documents which indicate whether new documents, when the criteria are met, should be encrypted. The criteria are preferably stored in the file administration table described above. To perform the third test, the crypto server 330 passes a database query to the EDM client 320 to have the EDM server 325 query the EDM database 345. For existing files, the query is directed to the encrypted files table. For new files, the query is directed to the file administration table. The EDM server 325 then passes the results of the test back to the EDM client 320, which provides the test results to the crypto server 330.

If for any reason the document is not to be encrypted, then the crypto server 330 passes control to the EDM client 320 which performs the "close," "save" or "save as" command on the unencrypted document. Alternatively, the decision not to encrypt, for one or more reasons, may result in an error message being displayed to the user, and may result in the document not being closed or saved. At this point, for documents which are not to be encrypted, the method is complete (step 445).

If, in step 430, the document is to be encrypted, then the crypto server 330 preferably obtains an encryption key name which is associated with the document (step 450).

The crypto server 330 then uses the encryption key name to retrieve an encryption key value which is associated with the encryption key name (step 455). For most encryption algorithms, the encryption key is a multi-digit number which is difficult to remember and even difficult to transcribe. The encryption key name is preferably an alphanumeric descriptor which may be used by the user and/or system administrator for administering the encryption key value. Preferably, the encryption key value is also related to the identify of the user, and this is accomplished by retrieving the encryption key value from the key table stored in the smart card 265 which is associated with the relevant encryption key name.

Once the crypto server 330 has the encryption key value, the crypto server 330 then encrypts the document with the encryption key value (step 460), and passes control to the EDM client (step 435) so that the document may be saved (step 440). At this point, for documents which are to be encrypted, the method is complete (step 445).

Figure 5:
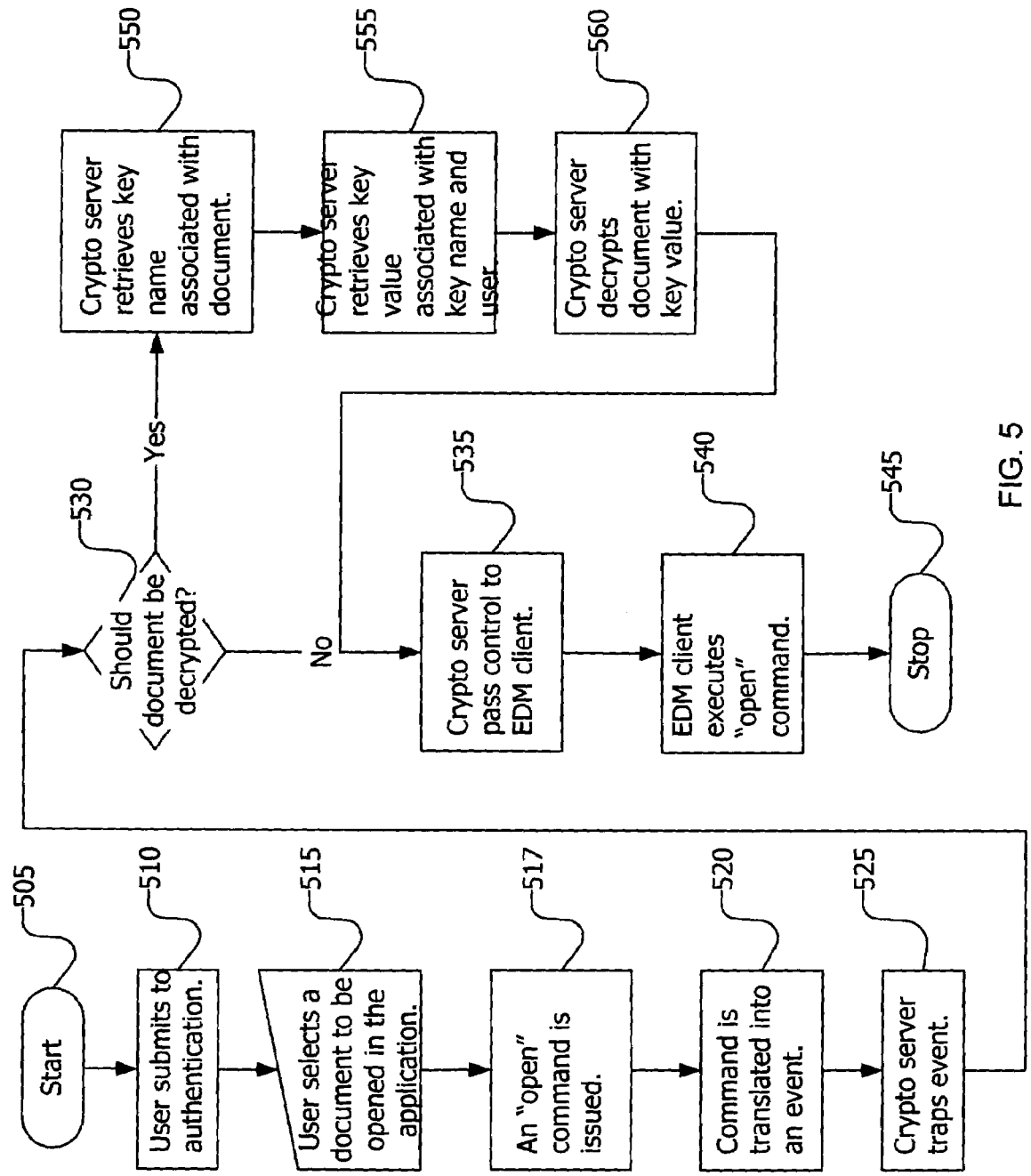
FIG. 5 is a flowchart of a decryption process in accordance with the invention.

Turning now to FIG. 5, there is shown a flowchart of the decryption process in accordance with the invention. After the process begins (step 505), it is preferred that the user submit to authentication (step 510). Authentication (step 505) preferably is the same for encryption and decryption.

At some point after the user has been authenticated, the user will wish to open a document into the application 350 (step 515). The file open command may be issued from within the application 350 or may be issued by a second application, with the nature of the document such that the application 350 will actually open the document and provide access to the document's contents. In any case, once the user selects a document to be opened, an "open" command is issued (step 517). The open command is then translated into an event (step 520), and the crypto server 330 traps this event (step 525).

The trapped event has the effect of alerting the crypto server 330 that it may be necessary to decrypt the document. However, preferably before decrypting the document, the crypto server 330 tests whether the document should be decrypted (step 430). Preferably, these tests are complimentary to those described above with respect to the encryption process.

If for any reason the document is not to be decrypted, then the crypto server 330 passes control to the EDM client 320 which performs the "open" command. Alternatively, the decision not to decrypt, for one or more reasons, may result in an error message being displayed to the user, and may result in the document not being opened. At this point, for documents which are not to be decrypted, the method is complete (step 545).

If, in step 530, the document is to be decrypted, then the crypto server 330 preferably obtains a decryption key name which is associated with the document (step 550). The decryption key name is preferably obtained from the file's header or from the encyrpted files table.

The crypto server 330 then uses the decryption key name to retrieve a decryption key value which is associated with the decryption key name (step 555). Preferably, the decryption key value, like the encryption key value, is also related to the identify of the user, and this is accomplished by retrieving the decryption key value from the key table stored in the smart card 265 and associated with the decryption key name.

Once the crypto server 330 has the decryption key value, the crypto server 330 then decrypts the document with the decryption key value (step 560), and passes control to the EDM client (step 535) so that the decrypted copy of the document may be opened into the application (step 540). At this point, for documents which are to be decrypted, the method is complete (step 545).

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A process of decrypting documents comprising:
providing plural documents having respective names
providing a crypto server for causing documents to be decrypted
providing a first table having
the names of encrypted documents
for each of the names of encrypted documents in the first table, a key name associated with a decryption key value for the encrypted document
detecting an open command for a given document issuing from a user of an application program using a user input device
in response to the open command, the crypto server using the first table to determine if the given document should be decrypted
if the given document should be decrypted, then
retrieving the key name associated with the name of the given document from the first table
retrieving the decryption key value associated with the key name from a second table, the second table having at least one decryption key value
causing the given document to be decrypted.

2. The process of decrypting documents of claim 1 further comprising providing an electronic document management system comprising a SQL database, a SQL database server and a SQL database client, wherein the electronic document management system performs the detecting step.

3. The process of decrypting documents of claim 1 further comprising
providing a database, the database including an indicator of whether the documents should be decrypted if the indicator in the database does not indicate that the given document is to be decrypted, determining that the document should not be decrypted.

4. The process of decrypting documents of claim 1 further comprising decrypting the given document with a DES algorithm.

5. The process of decrypting documents of claim 1 wherein the second table is stored in a smart card.

6. A computer program product comprising a computer usable medium having computer readable program code embodied therein for decrypting documents, the program code for causing a processor to
cause plural documents to be decrypted, the documents having respective names
record in a first table
the names of the encrypted documents
for each of the names of encrypted documents in the first table, a key name associated with a decryption key value for the encrypted document
detect an open command for a given document issuing from a user of an application program using a user input device
in response to the open command use the first table to determine if the given document should be decrypted
if the given document should be decrypted, then
retrieve the key name associated with the name of the given document from the first table
retrieve the decryption key value associated with the key name from a second table, the second table having at least one decryption key value
cause the given document to be decrypted.

7. The computer program product of claim 6, the program code further for causing the processor to decrypt the given document with a DES algorithm.

8. A general purpose computer system comprising the computer program product of claim 6.

9. The computer program product of claim 6, the program code further for causing the processor to obtain decryption key values from a portable data storage device.

10. The computer program product of claim 6 wherein the second table is stored in a smart card.

11. A computer program product comprising a computer usable medium having computer readable program code embodied therein for encrypting documents, the program code for causing a processor to
cause plural documents to be encrypted, the documents having respective names
record in a first table
the names of the encrypted documents
for each of the names of encrypted documents in the first table, a key name associated with an encryption key value for the encrypted document
detect a close command for a given document issuing from a user of an application program using a user input device
in response to the close command use the first table to determine if the given document should be encrypted
if the given document should be encrypted, then
retrieve the key name associated with the name of the given document from the first table retrieve the encryption key value associated with the key name from a second table, the second table having at least one encryption key value and at least one key name respectively associated with a one of the encryption key values cause the given document to be encrypted.

12. The computer program product of claim 11, the program code further for causing the processor to encrypt the given document with a DES algorithm.

13. A general purpose computer system comprising the computer program product of claim 11.

14. The computer program product of claim 11, the program code further for causing the processor to obtain encryption key values from a portable data storage device.

15. The computer program product of claim 11 wherein the second table is stored in a smart card.

\* \* \* \* \*